United States Patent
Graefe et al.

(10) Patent No.: US 9,575,999 B2
(45) Date of Patent: Feb. 21, 2017

(54) SYSTEM FOR MANAGING ADDRESS REFLECTORS

(75) Inventors: Goetz Graefe, Madison, WI (US); Harumi Kuno, Cupertino, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 442 days.

(21) Appl. No.: 13/995,187

(22) PCT Filed: Dec. 21, 2010

(86) PCT No.: PCT/US2010/061518
§ 371 (c)(1),
(2), (4) Date: Jun. 18, 2013

(87) PCT Pub. No.: WO2012/087293
PCT Pub. Date: Jun. 28, 2012

(65) Prior Publication Data
US 2013/0282719 A1    Oct. 24, 2013

(51) Int. Cl.
  *G06F 17/30*   (2006.01)
  *G06Q 10/10*   (2012.01)
(52) U.S. Cl.
  CPC ....... *G06F 17/30283* (2013.01); *G06Q 10/107* (2013.01); *G06F 17/30864* (2013.01); *G06Q 10/10* (2013.01)
(58) Field of Classification Search
  None
  See application file for complete search history.

(56) References Cited

U.S. PATENT DOCUMENTS

| | | | |
|---|---|---|---|
| 7,359,947 B2 | 4/2008 | Kelley et al. | |
| 7,613,732 B2 | 11/2009 | Oh | |
| 2008/0104075 A1 | 5/2008 | Heumesser | |
| 2008/0201433 A1 | 8/2008 | McDonald | |
| 2008/0222256 A1 | 9/2008 | Rosenberg et al. | |
| 2008/0235334 A1* | 9/2008 | Gupta et al. | 709/206 |
| 2009/0010405 A1* | 1/2009 | Toebes | H04M 1/274558 379/93.23 |
| 2009/0327438 A1 | 12/2009 | Cheng et al. | |
| 2011/0072090 A1* | 3/2011 | DeLuca | G06Q 10/107 709/206 |
| 2011/0099211 A1* | 4/2011 | Hyatt | G06F 17/30604 707/812 |

FOREIGN PATENT DOCUMENTS

KR    10-2010-0117992 A    11/2010

* cited by examiner

*Primary Examiner* — Rehana Perveen
*Assistant Examiner* — Raheem Hoffler
(74) *Attorney, Agent, or Firm* — Michael A. Dryja

(57) ABSTRACT

A system is disclosed for managing address reflectors. In one example, the system discloses a reflector storage 108, 116, 124, 608, with a set of reflector members 304 associated with a set of reflector names 306. The system also includes a computer 100, 604 programmed with executable instructions 500, 610 which operate a set of modules. The modules includes reflector management module 106, 114, 122 which, receives a character-string from user input 104, 120, and identifies the reflector names 306 whose reflector members 304 are partially defined by the character-string.

20 Claims, 6 Drawing Sheets

| Bitmap Index 302 | Reflector Members 304 | | | | | |
|---|---|---|---|---|---|---|
| Reflector Names 306 | 202 (Grandma) | 204 (Grandpa) | 206 (Mom) | 208 (Dad) | 210 (Sister) | 212 (Brother) |
| Reflector 222 (Relatives) | 1 | 1 | 1 | 1 | 1 | 1 |
| Reflector 220 (Grandparents) | 1 | 1 | 0 | 0 | 0 | 0 |
| Reflector 218 (Family) | 0 | 0 | 1 | 1 | 1 | 1 |
| Reflector 216 (Children) | 0 | 0 | 0 | 0 | 1 | 1 |
| Reflector 214 (Mom & Dad) | 1 | 1 | 1 | 1 | 0 | 0 |
| Reflector 226 (Grand Surprise Party for Mom & Dad) | 1 | 1 | 0 | 0 | 1 | 1 |

Fig. 3

Relational Index 402

| Reflector Members 304 | Reflector Names 306 |
|---|---|
| 202 (Grandma) | 222(Relatives); 220(Grandparents); 226(Grand Surprise Party) |
| 204 (Grandpa) | 222(Relatives); 220(Grandparents); 226(Grand Surprise Party) |
| 206 (Mom) | 222(Relatives); 218(Family); 214(Mom & Dad) |
| 208 (Dad) | 222(Relatives); 218(Family); 214(Mom & Dad) |
| 210 (Sister) | 222(Relatives); 218(Family); 216(Children); 226(Grand Surprise Party) |
| 212 (Brother) | 222(Relatives); 218(Family); 216(Children); 226(Grand Surprise Party) |

Fig. 4

SYSTEM FOR MANAGING ADDRESS REFLECTORS

BACKGROUND OF THE INVENTION

Brief Background Introduction

The present invention relates generally to systems and methods exchanging information. More specifically, information often needs to be passed to a relevant set of recipients. However, identifying such relevant recipients and managing them is often a very cumbersome. Further improvements to such information exchanges are desired.

BRIEF DESCRIPTION OF THE DRAWINGS

Some examples of the invention are described in the following figures:

FIG. 3 is a first data structure diagram used by one example of the system;

FIG. 4 is a second data structure diagram used by one example of the system;

DETAILED DESCRIPTION

Figure 1:
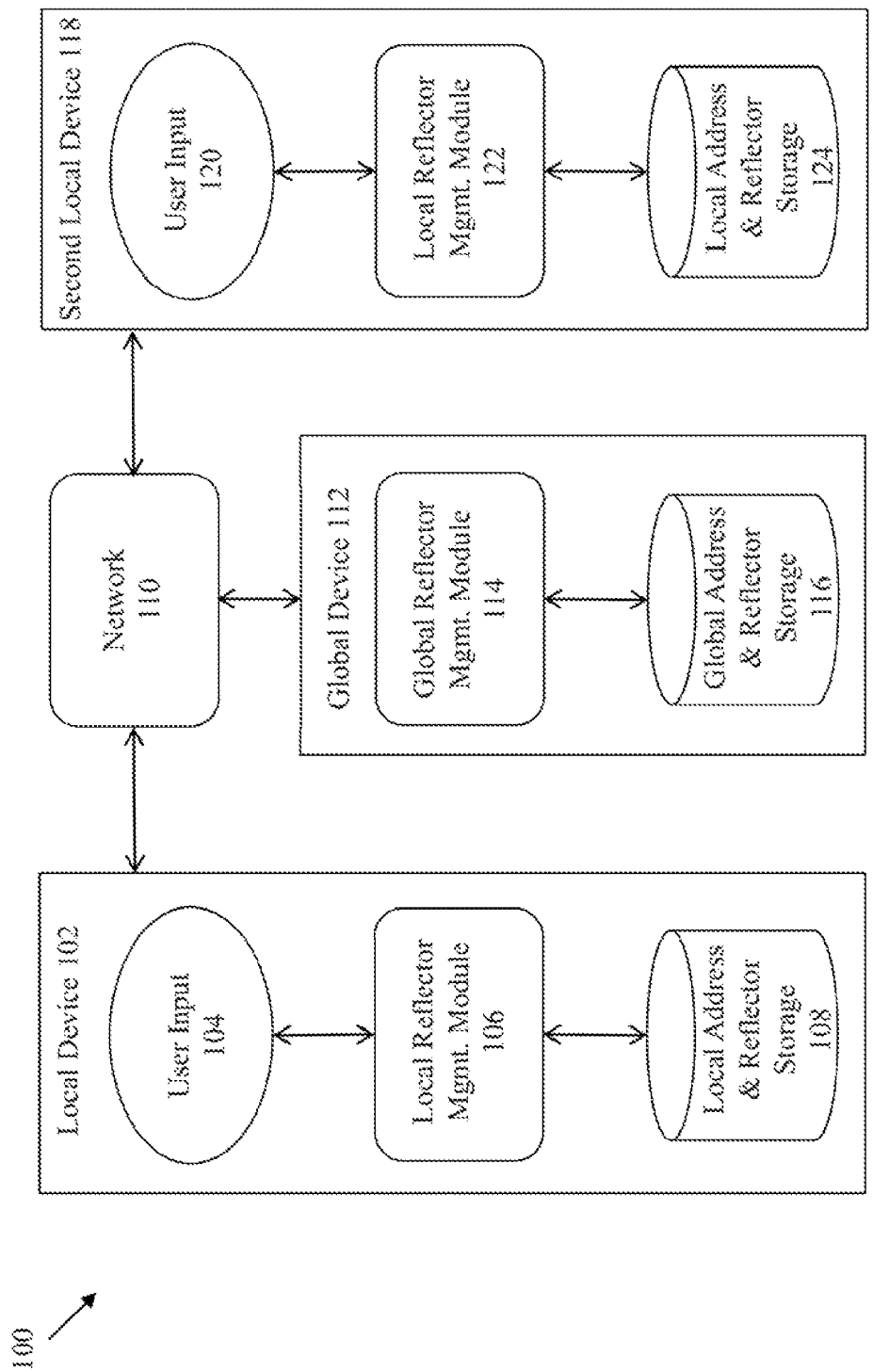
FIG. 1 is a dataflow diagram of one example of a system for managing address reflectors.

Information societies thrive on dynamic interconnectedness. Information ecosystems are created, function for a while, and then perhaps reform to serve a new function. E-mail, exchange is an example of a dynamic information ecosystem, whereby information that is communicated to a specific group of recipients may sometimes occur only once, before something changes in the ecosystem and another group of recipients needs to be identified and communicated with.

Oftentimes a group of recipients are aggregated (e.g. on a distribution list) for information sharing reasons. The group may be a "global group", such as that in an enterprise, or a "local (e.g. personal) group", such as one's social-network friends.

Not all those in the recipient group, or those who should be in the group, are aware that such a global or local grouping even exists, or what the group (e.g. distribution list, reflector) is called or labeled as. Instead, such recipients may only know that certain recipients are members of such a group, thereby requiring a time consuming exchange of e-mails, with such members, until all of the group's recipients or the distribution list, is identified.

For example, in the e-mail example, a user may need to transmit an e-mail message to a group of co-workers, but if the user does not know that there currently exists a "co-worker distribution list", that user will need to type in each of the co-workers one by one. Or perhaps the user knows that there is a "co-worker distribution list", but does not know the proper label for it, and thus again must type in each of the co-workers one by one. E-mail auto-completion functions which require that the user know at least the first few characters for the distribution list, will not help, if the user does not even know those first few characters.

What is needed is a set of tools for identifying current information ecosystem groups and tailoring them to meet ongoing and evolving information sharing needs. Such tools can help users maintain and manage their interconnectedness in a very dynamic way.

The present invention addresses and remedies many, if not all, of the concerns discussed above. For example, the present invention teaches techniques for managing both global and local reflectors, in a way that, allows users to quickly identify relevant recipient information and groupings, and also easily create new recipient groupings.

A reflector is herein defined to include a set of reflector members 304. The reflector members can include: a single address (e.g. an e-mail address, a printer device address, a mailing address, etc.); a group of addresses (e.g. a distribution list, or an electronic mailing list); a group of reflectors (e.g. multiple distribution lists); or any combination of these.

The reflector is also herein defined to include a reflector name 306, which provides an alias for labeling the reflector. In one example embodiment, the reflector is an e-mail distribution list, the reflector members 304 are the individual e-mails in the distribution list, and the reflector name 306 is the name of the distribution list which if typed, into the "To", "Recipient", etc. field of the e-mail, will send a copy of that e-mail to all e-mail addresses which are members 304 of that reflector.

Reflectors can be global or local. A "global reflector" is herein defined to include those reflectors that are managed primarily for the benefit of a set of local devices. A "local reflector" is herein defined to include those reflectors that are managed primarily for the benefit of just one local device. An example of a "global reflector" is a corporate enterprise distribution list. An example of a "local reflector" is a mobile device (e.g. smart-phone, cell phone, tablet, etc.) distribution list containing the names of the mobile device user's social network.

Details of the present invention are now discussed.

Figure 2:
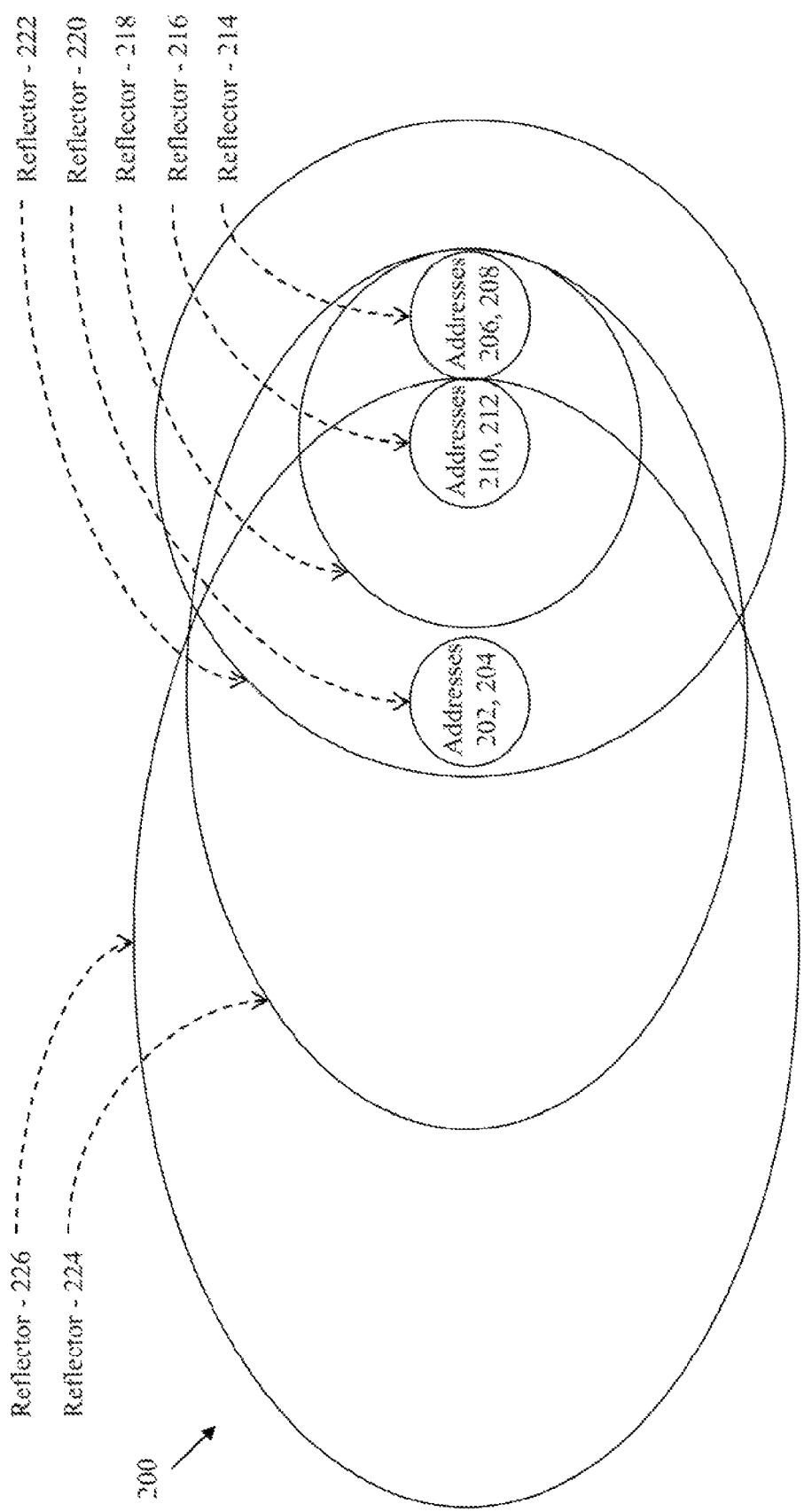
FIG. 2 is a relational diagram depicting one example of the system.

FIG. 1 is a dataflow diagram of one example of a system 100 for managing address reflectors. FIG. 2 is a relational diagram 200 depicting one example of the system 100. FIG. 3 is a first data structure 300 used by one example of the system. FIG. 4 is a second data structure 400 used by one example of the system. Due to the integrated operation of the system 100 with the data structures 300 and 400, and to facilitate a logical understanding of the present invention, FIGS. 1 through 4 are at times discussed together.

The present invention can be discussed in two main parts. In the first part, the system 100 manages the identification (i.e. discovery) of "existing reflectors" at, either the local or global level. In the second part, the system 100 manages the derivation (i.e. generation, creation) of "new reflectors" at either the local or global level from the "existing reflectors". The first part is now discussed.

An example of the system 100 is embodied in a local device 102. The local device 102 can be either a mobile device (e.g. smart-phone, cell phone, tablet, hand-held device, etc.) or a locally controlled device (e.g. a desktop computer, etc.).

A local reflector management module 106, within, the local device 102, receives a character-string (i.e. set of symbols, set of data bits, etc.) from user input 104, wherein the character-string corresponds to a portion of an address, an address name, a reflector, or a reflector name which are themselves members of another reflector.

The character-string represents a part of the reflector member's name (i.e. label). In one example embodiment, the character-string is a set of letters in an e-mail address, or a distribution list name. The reflector members 304 and reflector names 306 are stored in a local address & reflector storage 108.

FIG. 2 shows an example set of addresses 202, 204, 206, 208, 210, 212 and their membership, if any, in a set of reflectors 214, 216, 218, 220, 222, 224, 226. FIG. 2 also shows how the addresses and reflectors are related (i.e. associated) with each other. For example, addresses 206 and 208 are members of all of the reflectors 214, 216, 218, 220, 222, 224, 226 shown; however, address 210 and 212 are members of reflectors 214, 218, 220, 222, and 224, but are not members of reflectors 216 or 226.

FIG. 3 shows an example bitmap index 302 data structure for recording the association of reflector members (i.e. addresses or other reflectors) 304 with reflector names 306, such as those shown in FIG. 2. The index 302 shows: that all of the addresses 202, 204, 206, 208, 210, 212 are members of reflector 222, which is named "Relatives"; that addresses 202 and 204 (i.e. Grandma and Grandpa) are members of the reflector 220 which is named "Grandparents"; that the reflector 218, named "Family", includes addresses 206, 208, 210, and 212 as reflector members 304, and respectively correspond to Mom, Dad, Sister, and Brother. Note that, reflector 226, named "Grand Surprise Party for Mom & Dad", has been created and that addresses 206 (Mom) and 208 (Dad) have not been included to keep the party a surprise for them.

FIG. 4 shows an example relational index 402 data structure for recording the association of reflector members 304 with reflector names 306, shown in FIG. 2. The relational index 402 includes information which is equivalent to that discussed with respect to the bitmap index 302.

The local reflector management module 106 identifies a set of reflector names 306 having reflector members 304 (i.e. addresses and reflectors) partially defined by the character-string provided by the user input 104. "Partially defined" is herein defined to include: where the character-string forms "the first few concatenated characters of" the reflector members 304 name; and where the character-string forms "a set of concatenated characters found somewhere in" the reflector members 304 name.

The character-string does not need to be included in the reflector name 306 itself. Thus, the local reflector management module 106 can effectively "see through" the reflector name 306 to identify the reflector members 304 inside.

The reflector identification module identifies these reflector members 304 (i.e. addresses and reflectors) by accessing one or more indexed data structures residing in the storage 108. "Indexing" is a process of associating information attributes between domains, such as associating e-mail addresses with distribution lists. In one embodiment, the indexed data structures are the bitmap index 302 and the relational index 402 shown in FIGS. 3 and 4.

Next, the local reflector management module 106 presents the identified set of reflector names 306 to the user in a selectable list or menu. In another embodiment, the identified set of reflector names 306 are present to the user using a visually intuitive tool, such as a spatial or graphical plot, which shows how various addresses and reflectors are related to one another.

The selectable list, in one embodiment, arranges the identified reflectors and addresses in a "frequency of use" order based on how often the user input 104 has previously selected the reflector or address. In another example, the selectable list or menu is part of an e-mail auto-completion routine.

An example is now provided using the information in FIGS. 2, 3, and 4. In the example, if the user input 104 includes the character-string "grand", then the reflector management module 106 displays a selectable list or menu, which not only includes: address 202 (Grandma); address 204 (Grandpa); reflector 220 (Grandparents); and reflector 226 (Grand Surprise Party for Mom & Dad); but also includes: reflector 222 (Relatives) since address 202 (Grandma), address 204 (Grandpa), and reflector 220 (Grandparents) are members of reflector 222 (Relatives).

In another example embodiment, the reflector management module 106 can also present the user with a set of "child" members (i.e. addresses and reflectors) which while not including the character-string "grand" themselves, are nevertheless included in one or more of the "parent" reflectors, which were identified. For example, again referring to FIGS. 2, 3, and 4 for clarity, three additional reflectors (i.e. 218 (Family), 216 (Children), and 214 (Mom & Dad)) and four additional addresses (i.e. 210 (Sister), 212 (Brother), 206 (Mom), and 208 (Dad), are presented to the user since at least one of the reflectors identified above, reflector 222 (Relatives) contained them 218, 216, 214, 210, 212, 206, 208.

Thus the reflector management module 106 can be tailored to present address and reflector relationships in a variety of ways.

Next, the local reflector management module 106 receives user input 104 containing a reflector selection. This reflector selection is then passed on to an application program operating on the local device 102.

In an example embodiment the applications running on the local device 102 include: an e-mail application, a virtual meeting application, or a cloud network, application, and the selected reflector populates a field in one or more of these applications. For example, if the user input 104 selects reflector 226 (Grand Surprise Party for Mom & Dad) for an e-mail application, then the reflector management module 106 populates the "To" field of the e-mail, application with the following addresses 202, 204, 210, and 212, as shown in the bitmap index 302 of FIG. 3 and the relational index 402 of FIG. 4.

As hinted above, another example of the system 100 is embodied in a global device 112. The global device 112 can be a network resource, such as a server, a mail-server, a cloud service, and so on. The global device 112 can be connected to a set of local devices 102, 118 through a network 110. The global device 112 includes a global reflector management module 114, and a global address & reflector storage 116.

The global reflector management module 114 functions in a manner similar to the local reflector management module 106, already discussed, except that user input 104, and 120 is received by the global reflector management module 114 through the network 114.

In one embodiment of the system 100 the local devices 102 and 118 do not contain local address & reflector storage 108, 124, but instead any local device 102, 118 specific reflectors and addresses are stored in the global address & reflector storage 116. In one embodiment, the global reflector management module 114 is also a list-administrator for a mail-server application.

In one embodiment, when a set of local devices 102, 118 are connected, the local devices 102, 118 share their local addresses and reflectors, such that even if only one of the local devices 102 contained the local reflector management module 106, that local reflector management module 106 can still search and index the addresses and reflectors on the other local device 118, or on the global device 112. In this way multiple local, devices 102, 118 can "share" their "reflector ecosystems" (e.g. "discover" someone else's reflectors).

With local device 102, 118 sharing, the local reflectors stored in the local address & reflector storage 108, 124, can also be defined and shared across multiple heterogeneous e-mail clients (e.g. Microsoft Exchange, Lotus Notes, etc.).

As mentioned above, the present, invention can be discussed in two main parts. In the first part, the system 100 manages the identification (i.e. discovery) of "existing reflectors" at either the local or global level. In the second part, the system 100 manages the derivation (i.e. generation, creation) of "new reflectors" at either the local or global level from the "existing reflectors", as well as the modification of the "existing reflectors". The first part has just been discussed, and now the second part is discussed.

Once a set of currently "existing reflectors" have been identified in response to the character-string received from the user input 104, 120, additional user input 104, 120 can further create a "new set of reflectors" and/or modify the "existing reflectors". In one embodiment, the new reflectors are created through one or more "logical set" based commands, such as: AND, OR, XOR, NOT, and BOTH.

For example, referring to FIGS. 2, 3, and 4, at an earlier time, reflector 226 (Grand Surprise Party for Mom & Dad) may not have existed. Instead, the user of the local device 102 may have only had addresses 202, 204, 206, 208, 210, 212 and reflectors 214, 216, 218, 220, 222, 224. User input 104 however can create reflector 226 by first typing in a character-string which identifies reflector 222 (Relatives) and reflector 214 (Mom & Dad). Then user input 104 can define reflector 226 (Grand Surprise Party for Mom & Dad) as comprising the set "reflector 222 (Relatives) "NOT" reflector 214 (Mom & Dad)".

These new reflectors can either be added to the local address & reflector storage 108 for persistent reuse, or cached temporarily for just one or a few uses, in one example, a new re fleeter can be automatically generated based on AND-ing a list of e-mail addresses in a received e-mail message (e.g. for such purposes as e-mailing a photo to a group of friends, one or more of who just e-mailed you their photos).

Alternatively, in another example, the user may be given an option to modify an existing reflector, rather than create a new reflector. For example, when the user input 104 include the logical instruction "reflector 222 (Relatives) 'NOT' reflector 216 (Children)", the reflector management module 106 can prompt the user and ask whether the user would like to remove reflector 216 (Children) permanently from reflector 222 (Relatives), thereby modifying reflector 222 (Relatives).

Figure 5:
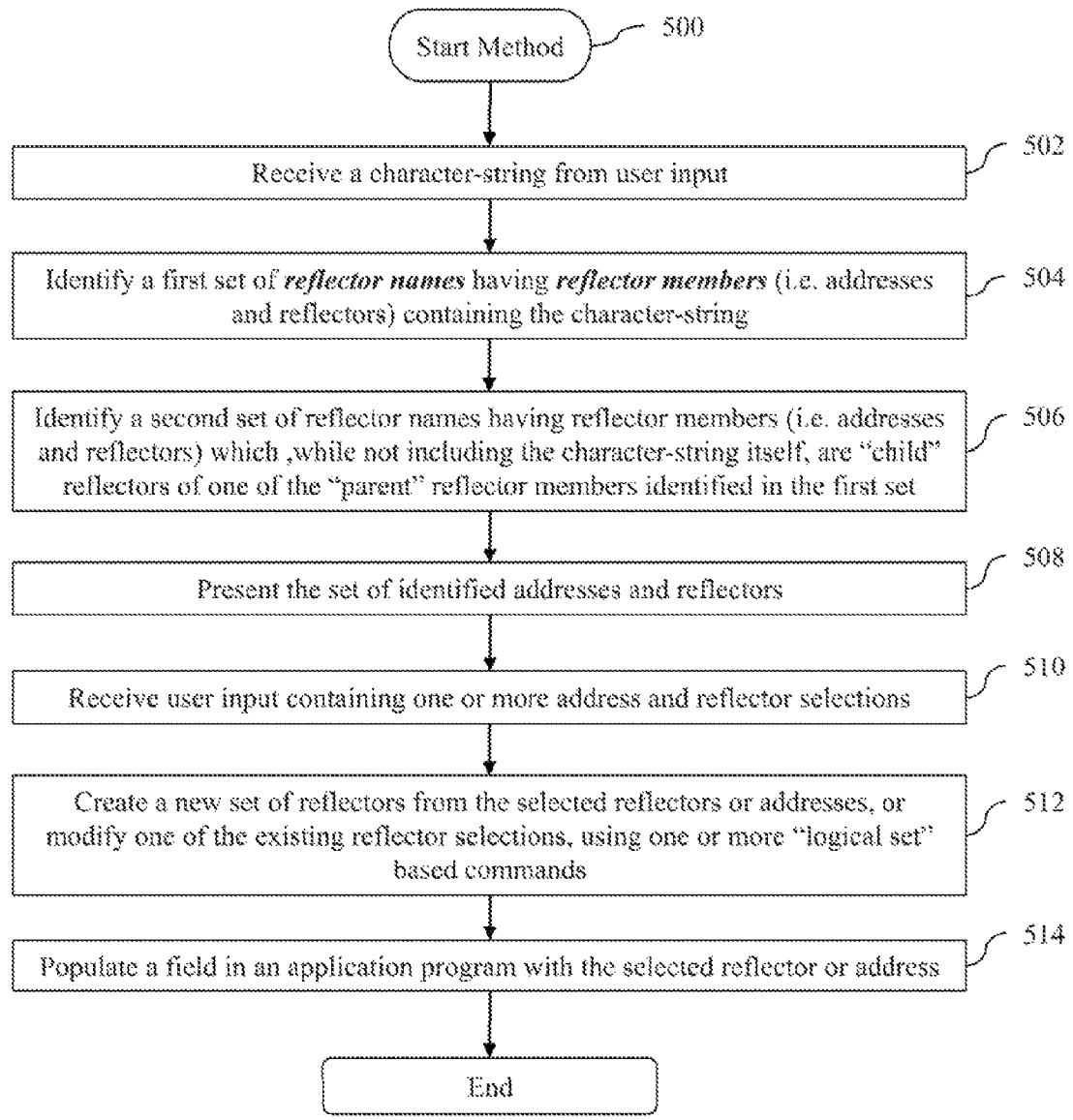
FIG. 5 is a flowchart of one example of a method for managing address reflectors.

FIG. 5 is a flowchart of one example of a method 500 for managing address reflectors. The blocks comprising the flowchart can be effected in any order, unless a specific order is explicitly stated. Also, those skilled in the art will recognize that while one example of the present invention's method is now discussed, the material in this specification can be combined in a variety of ways to yield other examples as well. The method next discussed is to be understood within a context provided by this and other portions of this detailed description.

The method 500 begins in block 502, where the local reflector management module 106, within, the local device 102, receives a character-string from user input 104.

Next, in block 504, the local reflector management module 106 identifies a first set of reflector names 306 having reflector members 304 (i.e. addresses and reflectors) containing the character-string. The set of reflector members 304 can be obtained either from a local device 102, a global device 112, or another local device 118.

Then in block 506, the local reflector management module 106 identifies a second set of reflector names 306 having reflector members 304 (i.e. addresses and reflectors) which, while not including the character-string itself, are "child" reflectors of one of the "parent" reflector members identified, in the first set. In block 508, the set of identified reflector members are presented to the user.

Then in block 510, the local reflector management module 106 receives user input 104 containing one or more address and reflector selections. In block 512, a new set of reflectors are created from the selected reflectors or addresses, or one or more of the existing reflectors are modified, using one or more "logical set" based commands, such as: AND, OR, XOR, NOT, and BOTH.

In block 514, the selected reflector or address populates a field in an application program.

Figure 6:
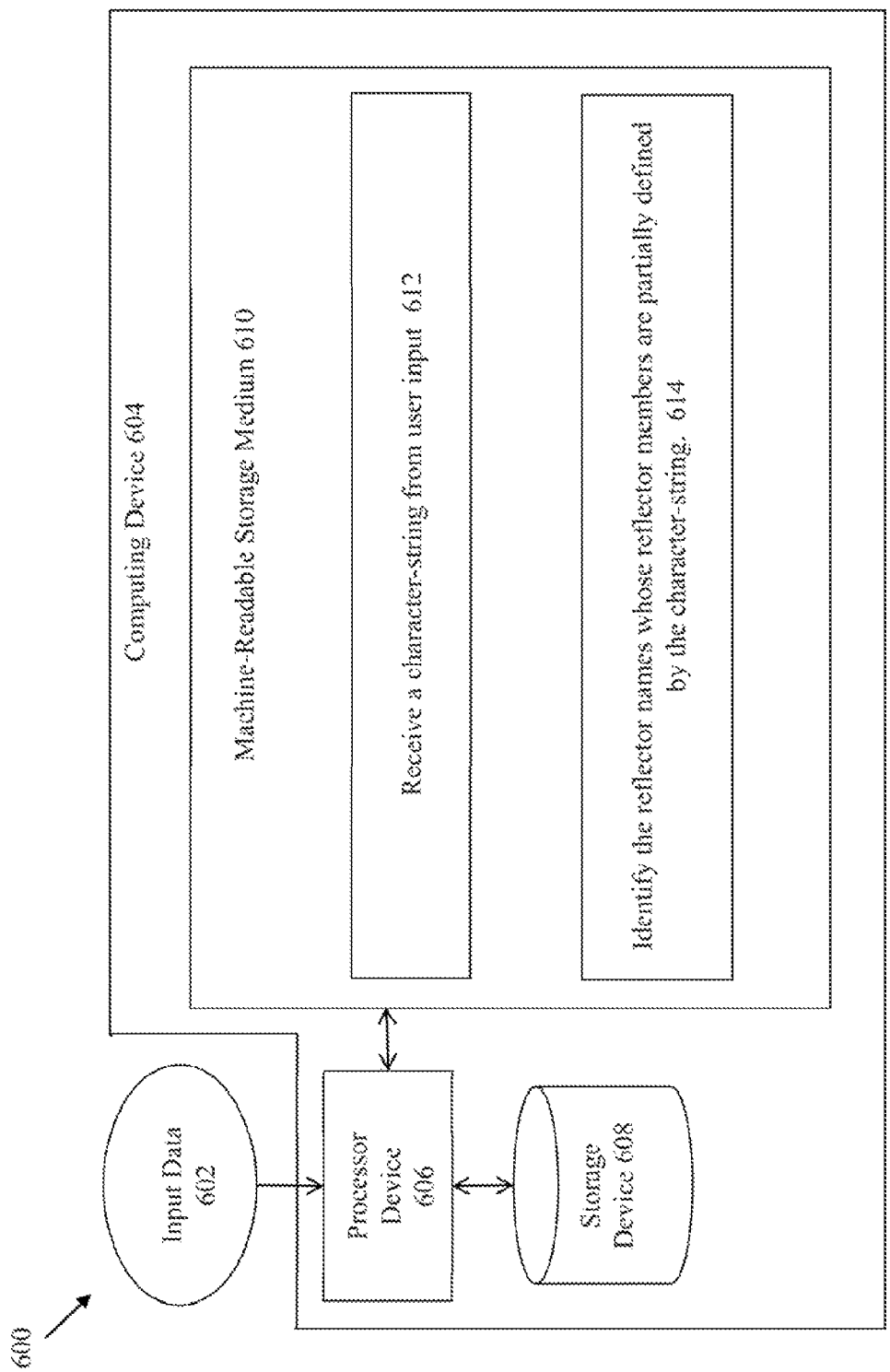
FIG. 6 is a dataflow diagram used by another example of the system.

FIG. 6 is a dataflow diagram 600 used by another example of the system 100. The diagram 600 shows input data 602 being received by a computing device 604. The computing device 604 includes a processor 606, a storage device 608, and a machine-readable storage medium 610. The storage device 608 includes a set of reflector members 304 associated with a set of reflector names 306.

Instructions within the machine-readable storage medium 610 control how the processor 606 interprets and transforms the input data 602, using data within the storage device 608. The instructions stored in the machine-readable storage medium 610 include: block 612, receive a character-string from user input 104, 120; and in block 614, identify the reflector names 306 whose reflector members 304 are partially defined by the character-string.

The processor (such as a central processing unit, CPU, microprocessor, application-specific integrated circuit (ASIC), etc.) controls the overall operation of the storage device (such, as random access memory (RAM) for temporary data storage, read, only memory (ROM) for permanent data storage, firmware, flash memory, external and internal hard-disk drives, and the like). The processor device communicates with the storage device and machine-readable storage medium using a bus and performs operations and tasks that implement one or more blocks stored in the machine-readable storage medium.

As used herein and in the claims, these words are further defined as follows:

The term, "cloud" is a computer network accessible over the internet and/or web that is dynamically scalable with virtualized resources, such as printing resources. Users are not required to have knowledge or expertise in the infrastructure of the cloud that relies on the internet to satisfy the computing or printing needs of users. The cloud provides computer and/or printing device services with business applications that are accessible from a web browser while software and data are stored on servers in the cloud. For example, a printing cloud system supports infrastructure for printing device services, platform for the printing device services, and software for the printing device services.

The term "printing device" is an electronic device that performs one or more functions of printing, scanning, and copying. In one example, a printing device is a printer. A printing device, however, is not limited to printers, but includes other devices, such as a scanner, a copier, a machine with facsimile operations, and/or a multi-functional device that performs two or more functions of printing, scanning, copying, and faxing.

The term "printer" is not limited to just standard printers, but includes various other types of electronic devices that perform one or more functions such as printing, scanning, or copying.

The term "file" or "a set of files" refers to any collection of files, such as a directory of files. A "file" can refer to any data object (e.g., a document, a bitmap, an image, an audio clip, a video clip, software source code, software executable code, etc.). A "file" can also refer to a directory (a structure that contains other files).

Functional and software instructions described above are typically embodied as a set of executable instructions which are effected on a computer which is programmed with, and controlled by said executable instructions. Such instructions are loaded for execution on a processor (such as one or more CPUs). The processor includes microprocessors, microcontrollers, processor modules or subsystems (including one or more microprocessors or microcontrollers), or other control or computing devices. A "processor" can refer to a single component or to plural components.

In one example, one or more blocks or steps discussed herein are automated. So other words, apparatus, systems, and methods occur automatically. The terms "automated" or "automatically" (and like variations thereof) mean controlled operation, of an apparatus, system, and/or process using computers and/or mechanical/electrical devices without the necessity of human intervention, observation, effort and/or decision.

In some examples, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of examples, those skilled in the art will appreciate numerous modifications and variations thereof. It is intended that the following claims cover such modifications and variations as fall within the true spirit and scope of the invention.

What is claimed is:

1. A system for managing address reflectors, comprising:
   a reflector storage including a set of reflector members associated with a set of reflector names;
   a processor; and
   machine-readable storage medium comprising executable instructions which, when executed by the processor, cause the processor to:
      receive a character-string from user input; and
      identify the reflector names whose reflector members are partially defined by the character-string, including identification of a parent reflector which includes at least one reflector member having a name which begins with the character-string; and
      identify a child reflector, which does not include at least one reflector member having a name which begins with the character-string, but which is itself a child member of the parent reflector.

2. The system of claim 1, wherein the executable instructions cause the processor to:
   identify the reflector names which include at least one reflector member having a name which begins with the character-string.

3. The system of claim 1, wherein the reflector name defines a distribution list and the reflector members includes an e-mail address.

4. The system of claim 1, wherein at least one of the reflector names is associated with at least one from a group including:
   a single address;
   a group of individual addresses; and
   a group of reflectors.

5. The system of claim 1:
   wherein the executable instructions cause the processor to:
      present the identified reflector names; and
      receive a selection of one of the identified reflector names; and
      populate a field in an application with the selection.

6. The system of claim 5, wherein the executable instructions cause the processor to:
   populate the field in the application by populating a recipient field in an e-mail application with the selected reflector.

7. The system of claim 1, wherein the executable instructions cause the processor to:
   identify a first reflector name whose reflector members are partially defined by a first character-string;
   identify a second reflector name whose reflector members are partially defined by a second character-string; and
   create a new reflector name whose reflector members are defined by a logical operation performed with respect to the first reflector name members and the second reflector name members.

8. The system of claim 1, wherein the executable instructions cause the processor to:
   identify a first reflector name whose reflector members are partially defined by a first character-string;
   identify a second reflector name whose reflector members are partially defined by a second character-string; and
   modify an existing reflector whose reflector members are defined by a logical operation performed with respect to the first reflector name members and the second reflector name members.

9. The system of claim 7, wherein the logical operation is at least one from a group including: a logical AND, a logical OR operation, a logical XOR operation, a logical NOT operation, and a logical BOTH operation.

10. The system of claim 7, wherein the executable instructions cause the processor to:

create a new distribution list whose e-mail address members are defined by AND-ing a list of e-mail addresses in a received e-mail message.

11. The system of claim 1, wherein reflector members are members of the parent reflector prior to reception of the character-string.

12. A system for managing address reflectors, comprising:
a reflector storage, including a set of reflector members associated with a set of reflector names; and
a processor; and
a machine-readable storage medium comprising executable instructions which, when executed by the processor, cause the processor to:
receive a character-string over a network from user input provided by another device; and
identify the reflector names whose reflector members are names for individual recipient e-mail addresses that are partially defined by the character-string including identification of a parent reflector name which includes at least one reflector member with an individual recipient e-mail address that is partially-defined by the character string; and
identify a child reflector, which does not include at least one reflector member with an individual recipient e-mail address that is partially-defined by the character string, but which is itself a child member of the parent reflector.

13. The system of claim 12, wherein the executable instructions, when executed by the processor, further cause the processor to:
present the identified reflector names;
receive a selection of a reflector name among the identified reflector names; and
populate a field in an application with the selection.

14. The system of claim 12, wherein reflector members are members of the parent reflector prior to reception of the character-string.

15. A method comprising:
receiving a character-string from user input through an e-mail application;
identifying a set of reflector names with a reflector member that is an individual recipient e-mail address or distribution list name that is partially defined by the character-string, including identifying a parent reflector name which includes at least one reflector member that is an individual recipient e-mail address or distribution list name that is partially-defined by the character string;
identifying, in the set of reflector names, a child reflector, which does not include any reflector member having an individual recipient e-mail address name or distribution list name that is partially-defined by the character-string, but which itself is a child member of the parent reflector;
presenting the identified set of reflector names;
receiving user input indicating a selected reflector from among the identified set of reflector names; and
populating a recipient field in an e-mail application with the selected reflector.

16. The method of claim 15, wherein presenting the identified set of reflector names comprises presenting the child reflector.

17. The method of claim 15, wherein the user input indicates multiple selected reflectors from among the identified set of reflector names; and further comprising:
creating a new set of reflectors that includes the multiple selected reflectors.

18. The method of claim 15, further comprising:
identifying a first reflector name whose reflector members are partially defined by a first character-string;
identifying a second reflector name whose reflector members are partially defined by a second character-string; and
modifying an existing reflector whose reflector members are defined by a logical operation performed with respect to the first reflector name members and the second reflector name members.

19. The method of claim 15, further comprising:
identifying a first reflector name whose reflector members are partially defined by a first character-string;
identifying a second reflector name whose reflector members are partially defined by a second character-string; and
creating a new reflector name whose reflector members are defined by a logical operation performed with respect to the first reflector name members and the second reflector name members.

20. The method of claim 15, wherein reflector members are members of the parent reflector prior to reception of the character-string.

* * * * *